No. 715,589. Patented Dec. 9, 1902.
L. E. LAURENT & E. E. CHERRY.
PULLEY BLOCK.
(Application filed Mar. 3, 1902.)
(No Model.)
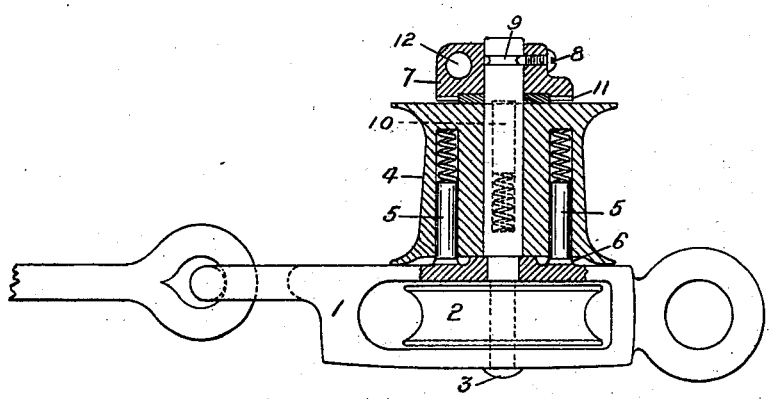
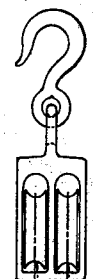
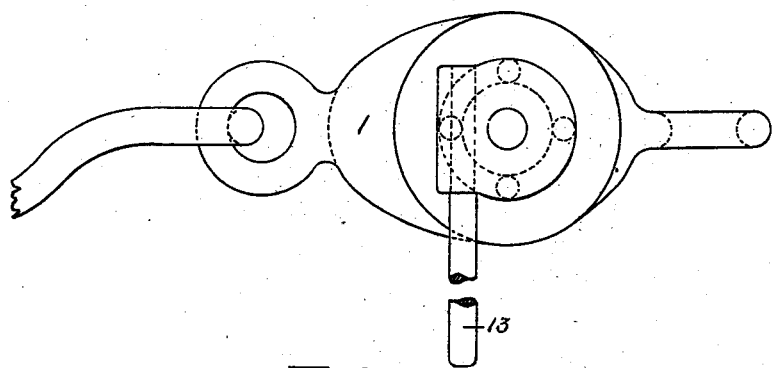
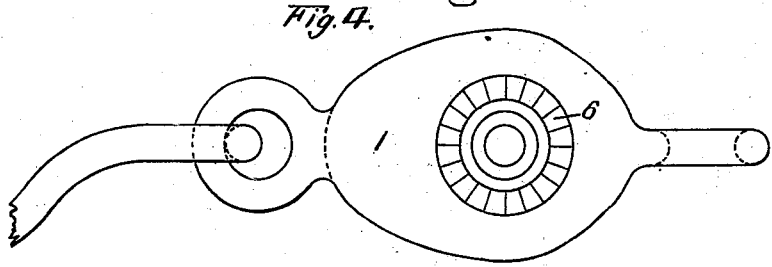
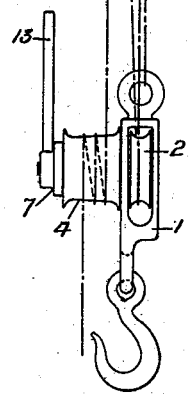
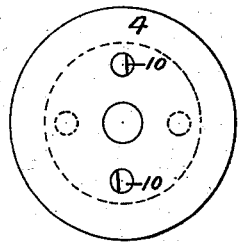
WITNESSES:
INVENTORS
Louis E. Laurent
Edward E. Cherry
BY
Chas. F. Dane
ATTORNEY

UNITED STATES PATENT OFFICE.

LOUIS E. LAURENT AND EDWARD E. CHERRY, OF TRENTON, NEW JERSEY.

PULLEY-BLOCK.

SPECIFICATION forming part of Letters Patent No. 715,589, dated December 9, 1902.

Application filed March 3, 1902. Serial No. 96,415. (No model.)

*To all whom it may concern:*

Be it known that we, LOUIS E. LAURENT and EDWARD E. CHERRY, citizens of the United States, residing at Trenton, Mercer county, State of New Jersey, have invented new and useful Improvements in Pulley-Blocks, of which the following is a specification.

In the use of ordinary pulley and tackle when the weight or strain becomes too great to be conveniently handled it is customary to employ in connection therewith a luff-tackle or other additional means to increase the drawing power and also provide an increased purchase for the rope. Such additional means, however, though effective, is not always readily obtainable, and, furthermore, cannot be conveniently employed in all instances. Having in mind such facts it has been the object of our invention to provide an improved pulley-block that may be employed in connection with a tackle in the usual manner and having means for the engagement therewith of the operating end or portion of the tackle-rope, which means may be employed to increase the drawing power and also afford an increased purchase for the rope, thus enabling the use of luff-tackle and other similar independent apparatus to be dispensed with.

In carrying our invention into effect we provide an ordinary pulley-block with an arm or spool at one side thereof. This pulley-block being adapted to be used in that part of a tackle nearest the operator enables the latter, if necessary, to pass the rope around the said spool as many times as may be necessary to obtain a desired hold or purchase. For such purpose the spool might be stationary relative to the pulley-block; but in order that the rope may be conveniently drawn in during any continued operation of the tackle we have supported said spool in a manner whereby it may be capable of rotation in the desired direction, the same being held against rotation in the opposite direction, so as to hold the rope and prevent undue playing out of the same, which latter operation may be accomplished, if desired, by loosening the rope on the spool. In order that the spool may be operated mechanically and with an increased power to wind the rope thereon, we have located an operating collar or ring upon the spool-supporting spindle or axle-pin adjacent to one end of the spool and provided a ratchet connection between the same, whereby an oscillating or backward-and-forward movement of said ring will effect a continuous rotation of the spool in the desired direction, such operation of the operating-ring being conveniently effected by a suitable bar or rod inserted into an opening therein. This construction and arrangement of parts permits a single person to employ a pulley and tackle in any desired location and rotate the spool with one hand to wind the rope thereon and draw up the slack with the other, although it will of course be understood that any number of persons may operate the same, according to the weight being handled. These features of invention are illustrated in the accompanying drawings and will be hereinafter more particularly described in connection therewith.

In the drawings, Figure 1 is a set of tackle comprising a pair of pulley-blocks and connecting tackle-rope, one of said blocks being provided with our improvements. Fig. 2 is an enlarged detail, partly in section, of the tackle-block embodying our improvements. Fig. 3 is a view of that side of the pulley-block looking toward the spool. Fig. 4 is a similar view with the spool removed. Fig. 5 is an outer end view of the spool detached from the block.

To explain in detail, 1 indicates a pulley-block, 2 the pulley-wheel, and 3 the spindle or axle-pin upon which said pulley-wheel is mounted within the block. This spindle 3, in accordance with our invention, is made of sufficient length to extend laterally beyond one side of the block and afford a support upon which the spool 4 is mounted.

The ratchet connection between the spool and the block for permitting rotation of the former in one direction only comprises, in the present instance shown, a pair of spring-pressed pawls 5 5, carried by the spool 4 within openings therein and engaging at their projecting ends with ratchet-teeth 6, located in the adjacent side of the block 1, as most clearly shown in Fig. 2. The number of pawls employed, however, or the particular construction and arrangement of the same may be varied, as will be understood.

At the outer end of the spindle 3 is located the operating collar or ring 7, the same, as shown, being provided with a pin or screw 8 therein, which is arranged with its inner end extending into a peripheral groove 9, formed in the said spindle. This construction serves to permit rotation of the ring on the spindle, but holds the same, and thereby the spool, against longitudinal displacement thereon. The ratchet connection between this operating-ring and the spool, similar to that between the spool and the pulley-block, comprises a pair of spring-pressed pawls 10 10, carried by the spool within openings therein (see Fig. 5) and engaging with ratchet-teeth 11 on the adjacent side of the ring. This ratchet connection, however, also, like that between the spool and block, may be varied more or less without departure from the invention.

The operating collar or ring 7 in the present case is provided with an opening 12 therein to receive the end of a rod, (indicated at 13,) by which the ring may be conveniently operated, although it will be obvious that any suitable means may be employed for such purpose.

Having thus set forth our invention, what we claim, and desire to secure by Letters Patent, is—

1. A pulley-block provided with a rotary spool at one side thereof, said spool being rotatable wholly independent of the pulley-wheel, for the purpose set forth.

2. A pulley-block provided with a rotary spool at one side thereof, said spool being rotatable wholly independent of the pulley-wheel, and with means for rotating the spool, for the purpose set forth.

3. A pulley-block provided with a rotary spool at one side thereof, and with means for permitting rotation of said spool in one direction only, for the purpose set forth.

4. A pulley-block provided with a rotary spool at one side thereof, and with means forming a ratchet connection between the same and said spool, for the purpose set forth.

5. A pulley-block provided with a rotary spool at one side thereof, means for normally permitting rotation of said spool in one direction only, and means for rotating the spool, for the purpose set forth.

6. A pulley-block, provided with a spindle at one side thereof having a spool and a spool-actuating device mounted thereon, the said actuating device having a ratchet connection with the spool, for the purpose set forth.

7. A pulley-block, provided with a spindle at one side thereof having a spool and a ring loosely mounted thereon, the said ring having a ratchet connection with the spool, for the purpose set forth.

In testimony whereof we have signed our names to this specification, in the presence of two subscribing witnesses, this 27th day of February, 1902.

LOUIS E. LAURENT.
EDWARD E. CHERRY.

Witnesses:
GEORGE MAYLAND,
M. MACINTYRE.